F. W. WRIGHT & C. R. ROOF.
METHOD OF MANUFACTURING GRIP NUTS.
APPLICATION FILED NOV. 24, 1913.

1,112,879.

Patented Oct. 6, 1914.

WITNESSES
Harold Nuof.
John Bell.

INVENTORS
F. W. WRIGHT.
C. R. ROOF.
BY
Tethuestondaught Smart
ATTYS.

UNITED STATES PATENT OFFICE.

FREDERIC WILLIAM WRIGHT AND CHARLES RICHARD ROOF, OF NEW GLASGOW, NOVA SCOTIA, CANADA.

METHOD OF MANUFACTURING GRIP-NUTS.

1,112,879.  Specification of Letters Patent.  Patented Oct. 6, 1914.

Application filed November 24, 1913. Serial No. 802,820.

*To all whom it may concern:*

Be it known that we, FREDERIC WILLIAM WRIGHT, a subject of the King of Great Britain, and CHARLES RICHARD ROOF, a citizen of the United States of America, both residing at New Glasgow, in the Province of Nova Scotia, in the Dominion of Canada, have invented certain new and useful Improvements in Methods of Manufacturing Grip-Nuts, of which the following is the specification.

This invention relates to improvements in methods of manufacturing grip nuts and the objects of the invention are to reduce the cost of manufacture and to enable the greater part of the formation of the nut to be performed by a pressing or rolling operation, and it consists essentially of the improved construction hereinafter described in detail in the accompanying specification and drawing.

Figure 1:
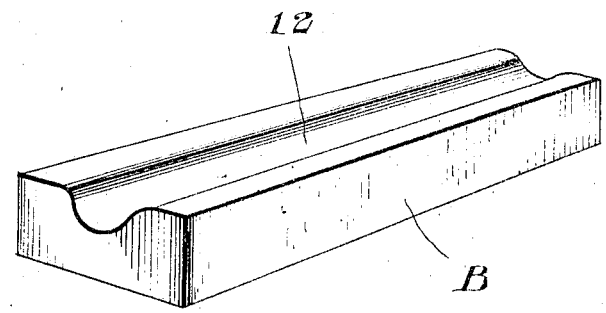
Figure 2:
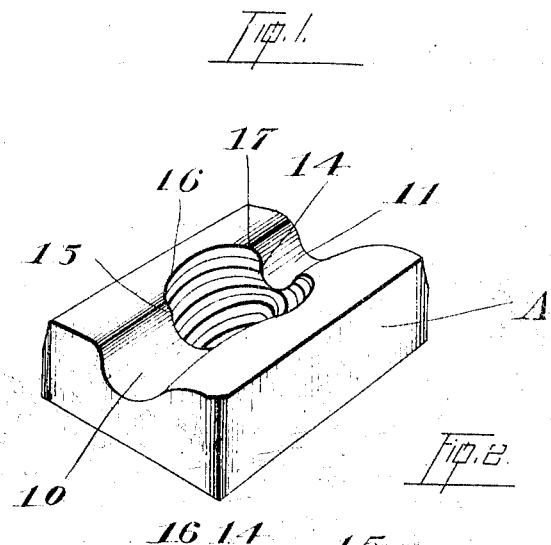
Figure 3:
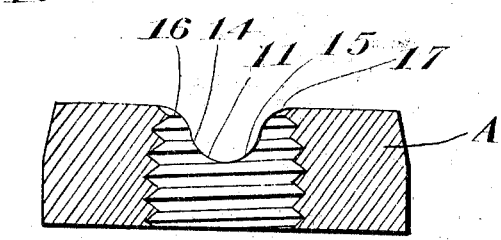

In the drawing, Figure 1 is a perspective view of the rolled bar from which the nut may be made. Fig. 2 is a perspective view of the nut itself. Fig. 3 is a cross section through the nut.

In the drawings like characters of reference indicate corresponding parts in all the figures.

Our invention relates to that type of grip nut in which the outer part of the nut is formed with recesses, the sides of the outer portion of the nut being bent toward each other to form a secure grip on the threads of the bolt.

In accordance with the present invention the recess is either rolled in the bar from which the nuts are made, or is pressed into the nut while hot.

Referring to the drawing, A represents the nut of any desirable size which is formed on opposite sides with transverse recesses 10 and 11, these recesses in the smaller nuts, for instance nuts up to one-half inch, being conveniently constructed by forming a suitable groove 12 in the bar B from which the nuts are cut and punched. It will also be observed that the formation of this recess reduces the amount of material which requires to be punched and so enables nuts up to one-half inch in size to be punched and cut off cold.

The shape of the groove 12, and consequently of the recesses 10 and 11, is such as to provide filleted corners 14 and 15 and rounded edges 16 and 17 on the recesses. With the larger nuts, that is nuts over one-half inch in size, the recesses would be pressed into the nuts by the nut machine while they are hot.

The nuts formed with the recesses as above described have their upper portions on opposite sides of the recesses pressed toward each other. The effect of this is seen in Fig. 3 of the drawing whereby it will be seen that the diameter of the perforation through the nut is narrower at the top or outer side than at the bottom whereby a secure locking action will be produced when the upper or outer portion of the nut is screwed onto the bolt.

We are aware that it is well known to cut or mill a slot in the outer portion of a nut and to press the sides of the nut together over the slot, but such construction is expensive from a manufacturing standpoint and the material cut from the recess is wasted. According to our invention the recess is pressed in the nut and the sides of the nut pressed toward each other over the recess, after the nut has been tapped.

It may be noted that the term "pressed" is employed in the claim to indicate either the operation in which the recess is rolled into the bar from which the nuts are formed, or that in which the recess is pressed into the nut by the nut machine. In either case the walls on opposite sides of the recess are pressed toward each other to produce the secure locking action hereinbefore described.

What we claim as our invention is:

In the art of making grip nuts, pressing a recess into the upper side of the nut and forming filleted corners on such recess, and then pressing the sides of the recess toward each other, whereby the diameter of the perforation through the nut is smaller on one side than on the other.

In witness whereof we have hereunto set our hands in the presence of two witnesses.

FREDERIC WILLIAM WRIGHT.
CHARLES RICHARD ROOF.

Witnesses:
JEAN I. REID,
SADIE M. PETTIS.